Sept. 15, 1925.
N. P. SJOBRING ET AL
1,553,728
ELECTRODE
Filed Sept. 27, 1923
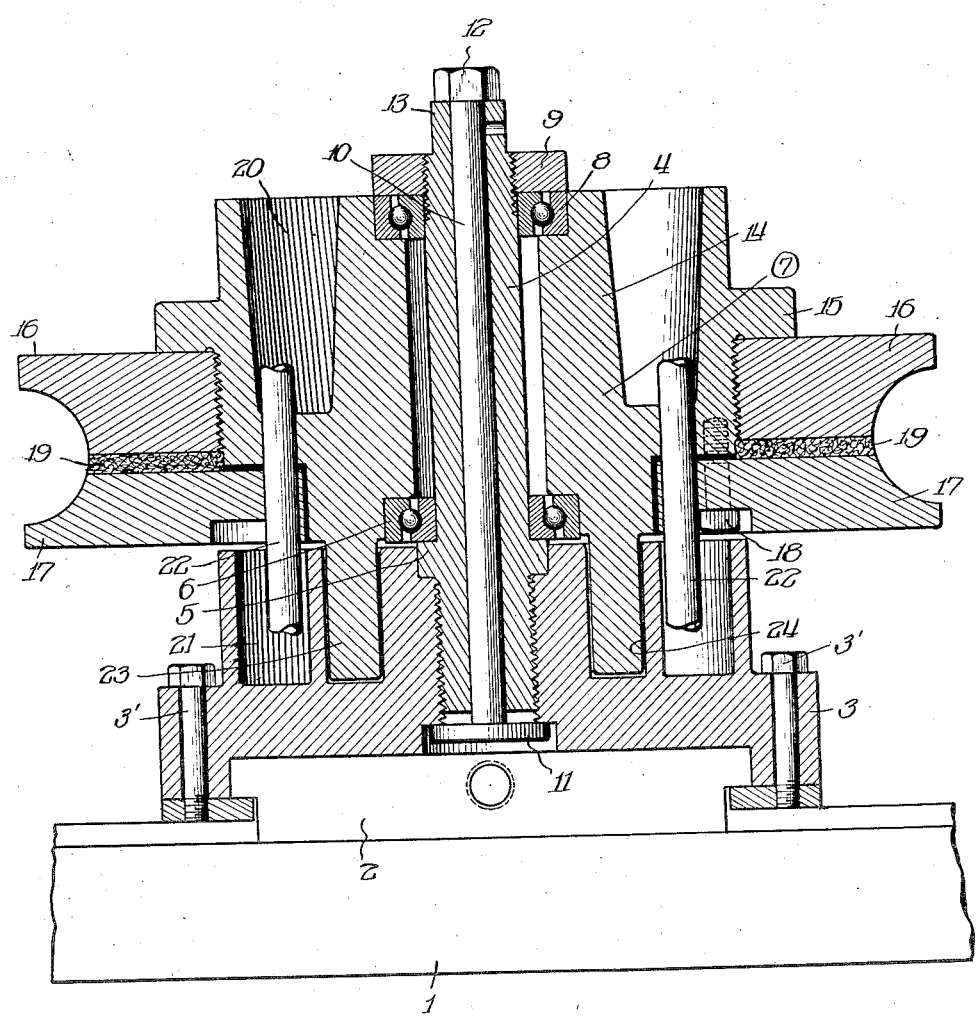
Witness:
R. Burkhardt.
Inventors:
Nels P. Sojbring
Martin Swanson,
Wilkinson, Huxley, Byron & Knight.
Attys.

Patented Sept. 15, 1925.

1,553,728

UNITED STATES PATENT OFFICE.

NELS P. SJOBRING AND MARTIN SWANSON, OF MILWAUKEE, WISCONSIN, ASSIGNORS TO GLOBE STEEL TUBES COMPANY, OF MILWAUKEE, WISCONSIN, A CORPORATION OF DELAWARE.

ELECTRODE.

Application filed September 27, 1923. Serial No. 665,064.

*To all whom it may concern:*

Be it known that we, NELS P. SJOBRING and MARTIN SWANSON, citizens of the United States, residing, respectively, at Milwaukee, in the county of Milwaukee and State of Wisconsin, and at Milwaukee, in the county of Milwaukee and State of Wisconsin, have jointly invented certain new and useful Improvements in an Electrode, of which the following is a specification.

The present invention relates to electrodes. More particularly the present invention relates to electrodes of the roller type which are used in the welding of tubing.

As is well known, tubing may be cheaply made by forming a flat strip of ribbon into tubular form and welding the adjacent side edges of said formed ribbon by the process of passing an electric current across the seam between said side edges whereby to form a complete tube. Devices for accomplishing this purpose have been known for many years but serious difficulties have been encountered in the operation of many such devices by reason of the fact that the electrodes have not efficiently performed their purpose. It has been determined through extensive experimentation that some of the difficulties encountered in the past in the electric welding of tubing has been due to the fact that the tubing has not been rigidly held while passing between the electrode rollers. Other difficulties have been traced to the fact that it has been difficult to turn down the rollers to true form after wear and pitting have occurred during service.

An object of the present invention is, therefore, to provide an electrode construction which will hold the tubing securely during the welding operation.

A further object is to provide an electrode construction which combines the advantages of a sturdy construction, ready adjustability, high electrical conductivity and a high degree of adaptability to machining when such machining is necessary to bring said electrode to proper form after wear and pitting have occurred in service.

Further objects will appear as the description proceeds.

The one figure of the drawing is a vertical sectional view illustrating a preferred embodiment of the present invention.

The numeral 1 indicates a part of a source of electrical current, such, for instance, as a transformer, which source 1 has the terminal 2 which, in the present instance, is illustrated as being a bearing member in the form of a track. Slidably mounted upon the track 2 is the electrode support 3 which may be moved in a direction toward and from the observer for the purpose of providing adjustability. Bolts 3′, 3′ may be provided for holding the support 3 in adjusted position. The support 3 has a spindle 4 screw threaded therein, said spindle having a shoulder portion 5 on which is mounted a ball-bearing 6 which forms the lower bearing of the electrode 7. The electrode 7 is supported on its upper side by the ball-bearing 8. Ball-bearing 8 may be held in position against the top side of electrode 7 by means of the nut 9 which has a screw threaded engagement with the spindle 4. It will be clear that by turning the spindle 4 the electrode 7 may be adjusted vertically, as desired, within limits. Mounted within the spindle 4 is the rod 10 provided with head portion 11 at the lower end thereof, which head portion 11 bears against the under side of electrode support 3. At the upper end of the rod 10 is a nut 12 having a screw threaded engagement with said rod 10. The numeral 13 indicates a flattened portion of the spindle 4 whereby said spindle may be conveniently gripped with a wrench when it is desired to adjust nut 9 or nut 12. Tightening down upon the nut 12 has the effect of holding the spindle 4, bearings 6 and 8, and electrode 7, all in their proper vertical positions.

The electrode roller 7 is a fabricated structure having the hub portion 14 supported by the ball-bearings 6 and 8. Said hub portion is provided with an annular shoulder 15 which forms an abutment for the electrode ring 16 which has screw threaded engagement with the hub 14, whereby to have a good electrical contact with said hub 14. Also supported by the hub 14 is the ring 17, said ring 17 being held rigidly in place by means of a plurality of circumferentially spaced bolts 18, only one of which is illustrated in the drawing. The electrode ring 16 may be composed of copper or other metal which will stand up well in service and which presents a high degree of conductivity. The ring 17 may be of material of substantially the same wearing quality as copper and which may be tooled in a lathe or other machine in substantially the same way that the material of electrode ring 16 may be tooled. The material of the ring 17 may be copper, brass or other material. Said ring 17 is insulated from ring 16, hub 14 and bolts 18, 18 by insulating material 19. The insulating material may be ebony board, asbestos or other material which will stand up well in service.

The welding ring 16, the holding ring 17 and the insulating material 19 may be grooved, as indicated in the drawing, to provide practically a semi-circle. The groove in the electrode illustrated will, when the electrode is used in cooperation with a corresponding electrode, form a substantially circular outline for the reception of tubing to be welded. It need not be explained that in service the welding ring 16 will be so designed as to leave a short gap between the corresponding part of a cooperating welding electrode whereby electric current in said welding ring 16 will be caused to pass through the tubing to be welded. The insulating material 19, it will be noted, constitutes only a very small proportion of the semi-circumference provided by the groove in the electrode roller 7. In practice it has been found that the electrode ring 16 composed of copper, the ring 17 composed of brass, and the insulating material 19 composed of ebony board, can be tooled very satisfactorily in an ordinary lathe and that said members wear with substantial evenness in service so that the proper contour of the electrode is maintained for prolonged periods and is readily renewed. It should be noted, moreover, that if unevenness in wear should develop between the insulating material 19 and members 16 and 17, the greatest wear will occur on the insulating material 19, and inasmuch as said insulating material comprises only a small proportion of the semi-circumference of the peripheral groove of the electrode roller, and inasmuch as said insulating material 19 is located at a region distant from the welding region, the net result of wear of said insulating material is a minimum.

The hub 14 of the electrode roller 7 is provided with an annular trough 20 for the reception of a cooling medium, and the support 3 is provided with an annular trough 21 for the reception of a cooling medium. A pipe 22 may be mounted in the roller 7 which pipe communicates with the trough 20 and with the trough 21 whereby a flow of cooling medium will occur from said trough 20 to said trough 21. Said cooling medium may be conducted away from the trough 21 through any preferred conduit (not shown).

The numeral 23 indicates an annular shoulder projecting downwardly from the electrode roller 7, being indicated as integral with the hub 14 of said roller. Said downwardly projecting shoulder extends into the trough 24 of the support 3, which trough may be filled with mercury or any other fluid of good conductivity.

The manner in which the above described embodiment of the present invention achieves the objects above set forth will be clear without detailed description. By reason of the adjustability of the spindle 4 the electrode roller may be adjusted vertically and by reason of the sliding engagement of the electrode support 3 relative to the terminal 2 adjustability is secured in a plane normal to the axis of rotation of said roller. The electrode support 3, the mercury bath within the trough 24 and the close engagement between the hub 14 and the electrode ring 16 provides a low path for electric current from the transformer 1 to the extremity of the welding ring 16. The electrode may have its temperature kept down to a safe point by reason of the cooling medium supplied to the trough 20 and thence directed through the pipe 22 to the trough 21. The insulating material 19 effectually insulates the hub 14, bolts 18, 18 and the welding ring 16 from the holding ring 17.

In practice, the electrode roller illustrated will be used in cooperation with a corresponding electrode, the peripheral groove in said electrodes receiving a tube to be welded, the seam in said tube being located between the outer extremity of the electrode ring 16 and a corresponding part on the cooperating electrode roller. The rings 16 and 17, and insulating material 19 will serve to hold the tubing during the welding operation and for this purpose the said rings 16 and 17 and insulating material 19 should embrace substantially a semi-circumference, the electrode ring 16, however, being of such a diameter that there will be no actual physical contact between the outer extremity of said electrode ring 16 and the corresponding portion of the cooperating electrode.

Inasmuch as the rings 16 and 17 may both be of metal, it is a simple matter to turn same down in a lathe or similar machine tool when repairs are necessary. The insulating material 19 need constitute only a small proportion of the semi-circumference of the grooved periphery of the electrode, for which reason said insulating material presents no difficulties either from the standpoint of wear or the matter of turning down the electrode in a lathe. As noted above, if the insulating material 19 should tend to wear faster than the rings 16 and 17, such action can do no harm inasmuch as the insulating material 19 constitutes only a small fraction of the holding surface of the electrode, said small fraction being spaced distantly from the region of the welding current.

Though a preferred embodiment has been illustrated, it will be clear that many modifications may be made without departing from the spirit of the invention. For example, though an electrode has been illustrated and described, shaped to weld cylindrical tubing, the invention is readily applicable to other cross-sectional shapes. It is intended in this patent to cover all such modifications that fall within the scope of the appended claims.

What is claimed is:

1. An electrode structure comprising supporting means, a rotatable hub carried by said supporting means, an electrode ring having screw threaded engagement with said hub, a holding ring supported by said hub, said holding ring having cutting characteristics similar to said electrode ring and insulating material for insulating said holding ring from said hub and said electrode ring.

2. An electrode roller comprising a hub, a welding ring intimately united to said hub to provide a good electrical connection therewith, a holding ring, insulating material for insulating said holding ring from said welding ring, said welding ring, holding ring and insulating material being grooved to provide a substantially semi-circumferential form.

3. An electrode roller comprising a hub, an electrode ring having screw threaded engagement with said hub, a holding ring bolted to said hub and insulating material for insulating said holding ring from the remainder of said roller.

4. An electrode roller comprising a hub, an electrode ring having screw threaded engagement with said hub, a holding ring bolted to said hub and insulating material for insulating said holding ring from the remainder of said roller, said electrode ring and holding ring having substantially the same cutting characteristics.

Signed at Milwaukee, Wisconsin, this 21st day of September, 1923.

NELS P. SJOBRING.
MARTIN SWANSON.